Feb. 19, 1952

R. W. ANDREASSON 2,585,986

APPARATUS FOR RELIEVING THE TEETH
OF CIRCULAR CUTTING ELEMENTS

Filed Dec. 27, 1948

INVENTOR.
Rudolf W. Andreasson,
BY
Harness, Dickey & Pierce
ATTORNEYS.

Patented Feb. 19, 1952

2,585,986

UNITED STATES PATENT OFFICE 2,585,986

APPARATUS FOR RELIEVING THE TEETH OF CIRCULAR CUTTING ELEMENTS

Rudolf W. Andreasson, Franklin, Mich.

Application December 27, 1948, Serial No. 67,528

11 Claims. (Cl. 51—95)

This invention relates broadly to grinding machines and more particularly to a machine of this character which is primarily adapted and preeminently suited for backing off or relieving helical teeth of workpieces such as drills, reamers, end-mill cutters and the like.

The device embodying the present invention is generally similar to the grinding machine disclosed in my copending application Serial No. 12,934 which was filed March 24, 1948, now Patent No. 2,547,845, dated April 3, 1951. The prior device, however, is adapted for grinding only workpieces having straight or rectilinear teeth, whereas the machine embodying the present invention is especially adapted for grinding workpieces having helical teeth and for maintaining a uniform, spatial relation between the ground peripheral surfaces and the forward or cutting edges of the teeth.

An important object of the present invention is to provide a grinding machine of the above-mentioned character that can be used for grinding cutting tools or other workpieces having either straight or helical teeth.

Another object of the invention is to provide a grinding machine that can be used to back off helical teeth having leads which vary progressively or otherwise along the length of the work, as well as teeth which have a constant lead.

Still another object of the invention is to provide a grinding machine that can be used to grind helical teeth having either right or left-hand lead or teeth having both right and left-hand lead, as in the case of a herringbone gear.

Yet another object of the invention is to provide a grinding machine that will grind the O. D. of the work and simultaneously grind peripheral relief on the teeth.

A further object of the invention is to provide a grinding machine capable of grinding peripheral relief on helical cutting teeth as a continuous operation when the work is traversed in front of the grinding wheel.

A still further object of the invention is to provide a grinding machine of the above-mentioned character that can be readily adapted to operate on workpieces having various numbers of cutting teeth.

A yet further object of the invention is to provide a grinding machine of the above-mentioned character that can be readily adapted for grinding the cutting faces of the teeth and that automatically assures exactly uniform spacing of the teeth around the circumference of the work.

Other objects and advantages of the invention will be apparent during the course of the following description.

In the drawing forming a part of this specification, and wherein like numerals are employed to designate like parts throughout the same:

Fig. 5 is a fragmentary, vertical, transverse sectional view taken on the line 5—5 of Fig. 3;

According to its broader aspects, the grinding machine embodying the present invention comprises a headstock 20 mounted on and movable with the usual table 22 which is longitudinally movable by a handwheel 24 on a suitable base 26.

A rotatably driven grinding wheel 28 is carried by the usual supporting structure 30, and the latter is movable in the conventional manner transversely on the base 26 and relative to the work by a handwheel 32. Preferably, the grinding wheel 28 also is angularly adjustable about a vertical axis according to conventional practice.

Figures 1, 2:
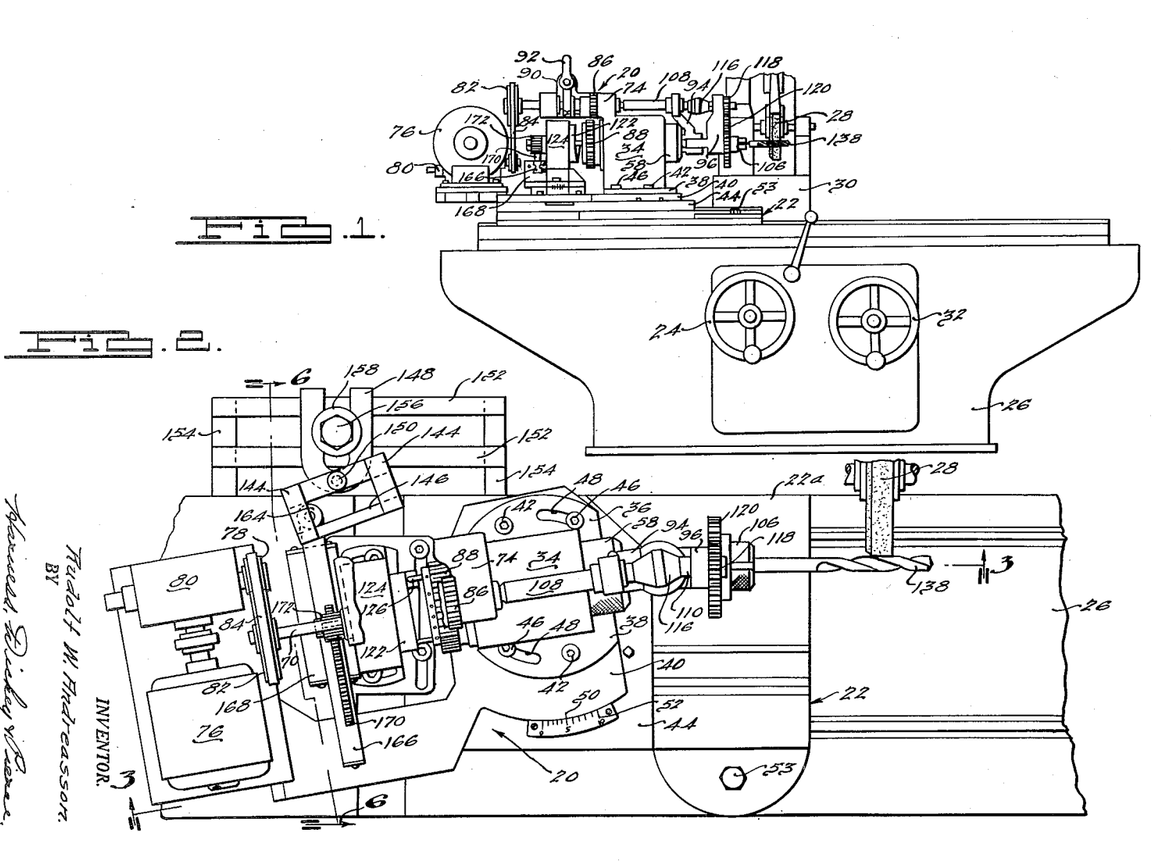
Figure 1 is a front elevational view of a grinding machine embodying the invention.
Fig. 2 is a top plan view of the same, showing the machine adapted for grinding a peripheral relief on the teeth of a drill.
Figure 2:
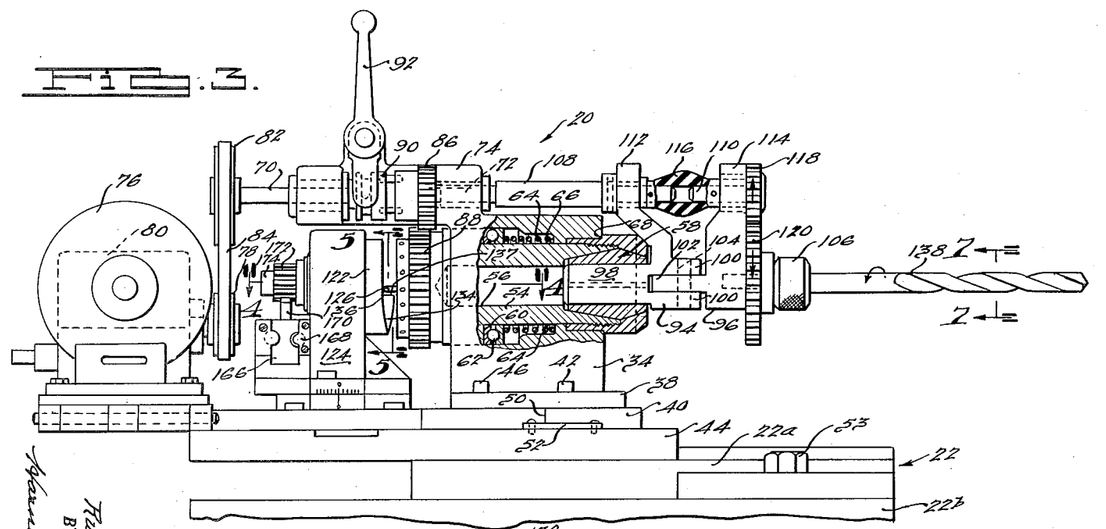

The headstock 20 comprises a support 34 having base flanges 36 and 38 which are fastened to a mounting plate 40 by screws 42. The mounting plate 40 in turn is mounted on and supported by a slide 44 which is longitudinally adjustable on the table 22 to initially position the work properly with respect to grinding wheel 28 and the table comprises upper and lower sections 22a and 22b. The mounting plate 40 is angularly adjustable about a vertical axis, and it is held in angularly adjusted position by screws 46 which extend through arcuate slots 48 in the support flanges 36 and 38 and in the mounting plate and into the slide 44. The angularly adjusted position of mounting plate 40 on the slide 44 is indicated in the usual manner by a reference mark 50 and a scale 52. In Fig. 2, the mounting plate 40 is shown adjusted 5° on the slide 44. Also, the upper table section 22a is angularly adjustable about the vertical pivot 53 in the conventional manner.

Figure 3:
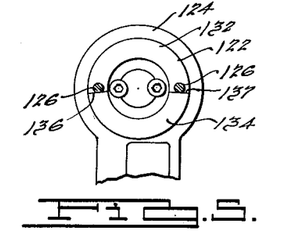
Fig. 3 is a fragmentary, vertical, longitudinal sectional view taken on the line 3—3 of Fig. 2.
Figure 4:
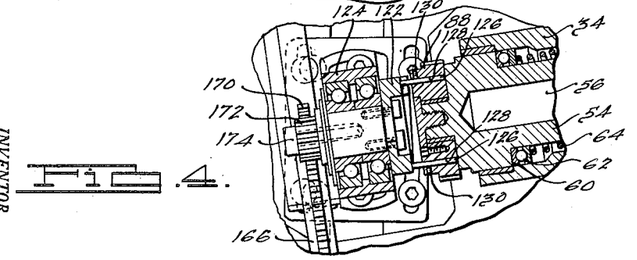
Fig. 4 is a fragmentary, horizontal sectional view taken on the line 4—4 of Fig. 3.

As shown in Fig. 3, a horizontal spindle 54 is mounted in the support 34 for rotation about and reciprocation along a horizontal axis. A relatively deep socket 56 is provided in the forward end of spindle 54 and a draw collet 58 is mounted on the end of the spindle to clamp a workpiece or other object inserted into the socket. Adjacent the rearward end thereof, the spindle 54 is formed with an external radial shoulder 60 which seats a thrust bearing 62, and a coil spring 64 confined between the bearing and an annular shoulder 66 in the support 36 urges the spindle constantly axially to the left as viewed in Fig. 3 without interfering with rotation of the spindle. Axial movement of the spindle 54 to the left is limited by a radially extending annular shoulder 68 on the draw collet 58.

The rotary drive for spindle 54 comprises horizontally aligned drive shafts 70 and 72 which are rotatably supported by respective arm portions of a U-shaped bracket 74 formed integrally on the support 36. A motor 76 drives a pulley 78 through a gear-reduction unit 80, and the pulley 78 is connected to a second pulley 82 on the shaft 70 by an endless belt 84. A gear 86 fixed on the shaft 72 meshes with a gear 88 on the rearward end of spindle 54, and the two shafts 70 and 72 are selectively connected or disconnected by a clutch 90 which may be of any usual or conventional design and is actuated manually by a suitable handle 92. As a result of this construction, the motor 78 can be operated continuously and the spindle 54 rotated as desired by engaging or disengaging the clutch 90. In this connection it will be observed that the motor 78 is mounted on an extension of the mounting plate 40 so that the motor and the support 34 turn as a unit when the mounting plate is adjusted angularly on slide 44 in the manner hereinabove described.

In the form of the invention here shown by way of illustration, the work is carried by a mounting bracket having swiveled sections 94 and 96. The rear section 94 is formed with a shank 98 which is adapted to be received in socket 56 and to be tightly clamped by the draw collet 58. At the forward end thereof, the rear section 94 is provided with bifurcations 100 which embrace a projecting tongue 102 on the front section 96. A pivot 104 extends through the bifurcations 100 and tongue 102 to complete the swivel connection.

In practice, the mounting bracket is positioned as shown in the drawings with the pivot 104 disposed vertically with respect to the table 22 so that the front bracket section 96 can swing in a horizontal plane about the pivot. A second collet 106 carried by the front bracket section 96 receives and tightly clamps the work. In operation, the two bracket sections 94 and 96 are adjusted angularly, as perhaps best shown in Fig. 2, to maintain the work parallel to the direction of travel of slide 44. If the mounting plate 40 is adjusted angularly 5° in a counterclockwise direction, the bracket sections 94 and 96 also are adjusted angularly 5° in a clockwise direction.

In order to rotatably drive the work, shafts 108 and 110 are journaled for rotation in arms 112 and 114 which are carried by and extend upwardly from respective bracket sections 94 and 96. Shaft 108 has a splined driven connection with shaft 72 and is connected for mutual rotation with shaft 110 by a flexible coupling 116. A gear 118 on shaft 110 meshes with and rotatably drives a gear 120 on collet 106. The torsionally yieldable flexible coupling 116 provides a constant velocity drive for the work regardless of the angular position of the front bracket section 96. Also, the flexible coupling 116 yields under a heavy cut in a direction to relieve pressure on the grinding wheel 28 whereby to prevent burning of the work.

Axial movement of the spindle 54 against the action of spring 64 is effected by a cam 122 which is mounted in a cam support 124 directly behind the spindle and has a vertically disposed annular cam face which is engaged by one or more cam followers 126 carried by and projecting axially and rearwardly from the gear 88. The cam followers 126 ride continuously on the cam face during rotation of the spindle 54. In the form of the invention here shown by way of illustration, the cam followers 126 merely comprise metal pins which fit in sockets 128 provided in the rear face of the gear 88. Set screws 130 hold the cam followers 126 securely in the sockets 128. The cam face here shown has a flat portion 132 and an inclined portion 134. As best shown in Fig. 5, the inclined portion 134 begins to rise gradually at about the point 136 and it reaches its maximum height at the point 137. From 137 the cam face drops or falls abruptly to the flat radial surface 132, as shown in Fig. 3.

The workpiece 138 shown by way of illustration in Figs. 1–7 is a conventional twist drill having two cutting edges 140. The two cutting edges 140 are disposed substantially 180° apart, and the peripheral surfaces 142 behind the cutting edges are radially relieved.

In order to grind the twist drill 138, two pins or followers 126 are provided, and the followers are disposed substantially 180° apart. As the spindle 54 rotates relative to the cam 122, the followers 126 are held constantly in engagement with the cam face by spring 64. As each follower 126 traverses the inclined cam portion 134, the spindle 54 advances; and, as the follower drops over the abrupt edge or shoulder 137, the spindle is retracted by spring 64. As best shown in Fig. 5, one follower 126 moves onto the inclined cam portion 134 as the other follower moves past the shoulder 137. Thus the spindle 54 is caused to reciprocate or oscillate twice during each revolution. Also, it will be readily apparent that the stroke of the spindle 54 will vary, depending upon the rise and fall of the cam 122.

Since the spindle 54 is disposed at a slight angle to the direction of traverse, oscillation or reciprocation of the spindle 54 in the manner hereinabove described moves drill 138 bodily generally in the direction of travel of the spindle and that a component of this movement is normal and relative to the face of grinding wheel 28. According to the present invention, oscillation of the spindle 54 and drill 138 in this manner is utilized for relief grinding.

Figures 6, 7:
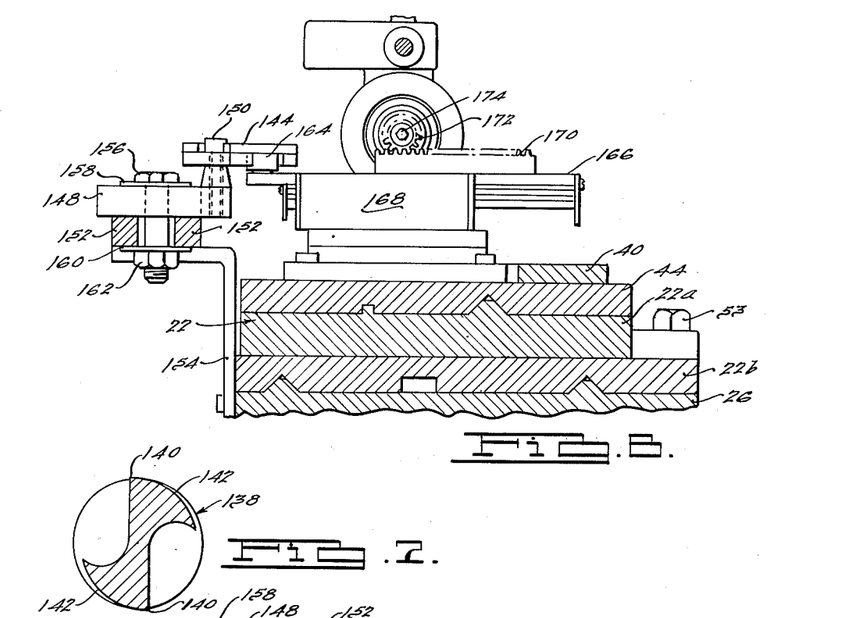
Fig. 6 is a fragmentary, vertical, transverse sectional view taken on the line 6—6 of Fig. 2.
Fig. 7 is a vertical, transverse sectional view taken on the line 7—7 of Fig. 3.

In operation, the drill 138 is positioned in the collet chuck 106 so that the peripheral areas 142 immediately behind the cutting edges 140 move against the grinding wheel 28 when spindle 54 is advanced. As each follower 126 rides up on the inclined cam surface 134 the spindle advances to press one of the surfaces 142 against the grinding wheel, and as each follower drops over the shoulder 137, the spindle 54 retracts so that the next cutting tooth can move into grinding position without damaging the cutting edge 140. In the setup illustrated in the drawing, the spindle 54 is oscillated twice during each rotation, and the timing is such that the drill 138 is pressed against the grinding wheel 28 each time a cutting tooth moves into operative relation with the wheel. As a result, the peripheral surface 142 behind each cutting edge is backed off or relieved, as shown in Fig. 7. The drill 138 is traversed in front of the grinding wheel 28 by a manipulation of hand wheel 24 in the manner hereinabove described so that all of the cutting teeth are backed off or relieved for the entire length of the drill body in a single operation. The amount of relief depends upon the rise and fall of cam 122 and upon the angularly adjusted position of mounting plate 40.

The above operation is substantially identical to the one described in my prior application hereinabove referred to and is suitable for grinding relief clearance on straight or rectilinear cutting teeth. However, in the case of tools having helical cutting teeth, such as the twist drill 138, it is necessary to adjust the work angularly and continuously during the traverse in order to compensate for the lead of the teeth. I have accomplished this object in a novel and highly efficient manner by making the cam 122 rotatably adjustable in the cam support 124 and providing means for constantly rotatably adjusting the cam during the traverse movement according to the particular lead of the work being ground.

According to the present invention, the means for adjusting cam 122 comprises a cam 144 having a cam track 146. The cam 144 is fastened to an adjustable supporting member 148 by a screw 150. Cam 144 is angularly adjustable about the screw 150 and is held in a selected adjusted position by tightening the screw. The supporting member 148 here shown is generally U-shaped and the cam 144 is fastened to the bight portion of the support. The arm portions of support 148 extend transversely across a pair of laterally spaced parallel supporting bars 152 which are carried by and fixed to brackets 154 on the base 26. A bolt 156 extends downwardly between the arms of support 148 and the bars 152. A washer 158 is interposed between the head of bolt 156 and the arms of support 148 and a washer 160 is provided between the bars 152 and a nut 162 on the bolt (Fig. 6). Thus, the cam 144 can be adjusted transversely or longitudinally on the machine when the nut 162 is loose and it can be held securely in the selected adjusted position by tightening the nut.

A cam follower, here shown in the form of a roller 164, is mounted to move in cam track 146 when the work 138 is traversed in front of grinding wheel 128. Cam follower 164 is carried by a slide 166 which is mounted between guide blocks 168 for movement in a direction transverse to the axis of cam 122. Also mounted on the slide 166 is a rack 170 which meshes with a pinion 172 coaxially associated with and fastened to the cam 122 by a cap screw 174.

Thus, the transverse component of movement which is imparted to the cam follower 164 by traverse of the work 138 is imparted to the slide 166 and such movement of the slide acts through rack 170 and pinion 172 to rotatably adjust the cam 122. Manifestly, the amount of angular adjustment imparted to cam 122 for a given linear movement of the work 138 on its traverse stroke depends upon the angular position of cam 144 and/or upon the shape of cam track 146. If the cam track 146 is merely straight or rectilinear as shown in the drawing, the angular adjustment of cam 122 is dependent entirely upon the angularly adjusted position of cam 144. When grinding a workpiece having helical threads, it is necessary to rotate cam 122 once each time the work moves on its traverse stroke a distance equal to the lead of the cutting teeth. Thus, if the lead of the thread is known, the angular position of cam 144 can be readily determined. In actual practice, however, I have found that the angular position of cam 144 for any particular workpiece can be readily determined on the job by gaging the work with respect to the grinding wheel at each end of its traverse stroke.

Thus, when grinding the twist drill 138, the machine is initially set up as shown in Figs. 1 and 2. When set up in this manner, the cam 122 is positioned angularly in the support 124 so that it presses the work against the grinding wheel as the periphery of each cutting tooth rotates across the wheel, and the cam 144 is positioned to adjust the cam 122 angularly when the tool 138 is traversed in front of the grinding wheel 28 to compensate for the lead of the teeth. The entire operation of positioning the work properly with respect to the grinding wheel 28 is fully automatic and proper correlation of the work and the grinding wheel is assured at all times. Since the cam 122 is adjusted angularly for every increment of traverse movement the back-off or relief of the cutting teeth is uniform for the entire length of the drill. Also, as the work is traversed in front of the grinding wheel, it can be accurately ground precisely to a predetermined O. D. and all of the cutting teeth can be identically backed off or relieved in the same operation.

Figures 8, 9:
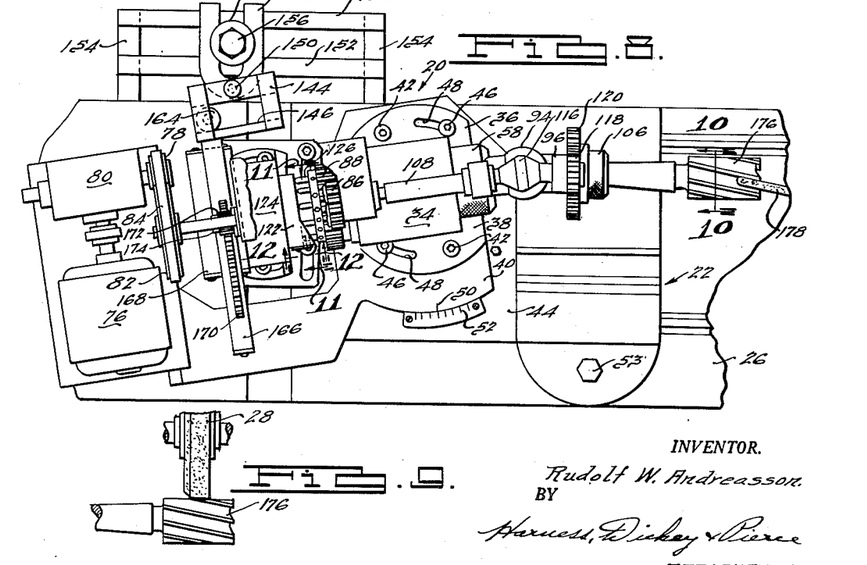
Fig. 8 is a fragmentary plan view showing the machine adapted for grinding the radial leading faces of a spiral reamer.
Fig. 9 is a fragmentary plan view showing the machine illustrated in Fig. 8 adapted for grinding peripheral clearance or relief on the cutting teeth of the reamer.
Figure 11:
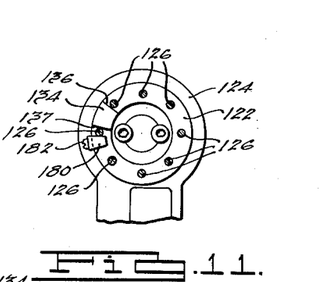
Fig. 11 is a fragmentary, vertical, transverse sectional view taken on the line 11—11 of Fig. 8.
Figure 12:
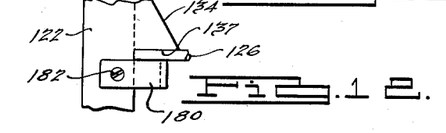
Fig. 12 is a fragmentary, vertical, longitudinal sectional view taken on the line 12—12 of Fig. 8.

In Fig. 8, I have shown the machine set up to dress the leading tooth faces of a workpiece such as the helical reamer 176. When the machine is adapted for this purpose, a suitable grinding wheel 178 is mounted in the conventional manner to extend along a flute of the workpiece, as shown in the drawing. A small stop 180 is detachably fastened to the cam 122 by a screw 182 so that it cooperates with the shoulder 137 of the cam to confine one of the cam follower pins 126 (Fig. 11).

Figure 10:
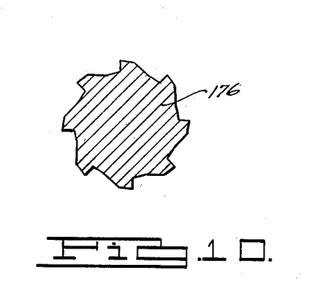
Fig. 10 is a vertical, transverse sectional view taken on the line 10—10 of Fig. 8.

In operation, the grinding wheel 178 is rotatably driven and the work 176 is traversed with motor 76 deenergized. During the traverse, cam follower 164 moves along the cam track 146 to rotatably adjust the cam 122 and consequently the reamer 176 angularly according to the lead of the reamer teeth. The reamer here shown has eight cutting teeth (Fig. 10); accordingly, eight cam follower pins 126 are provided in equispaced relation around the gear 88. Each pin is positioned progressively between the cam shoulder 137 and the stop 130; and since the gear 88 which carries the pins rotates in unison with the work 176, a different tooth is positioned in operative association with the grinding wheel 178 as each pin is moved into position. In this manner each tooth of the workpiece 176 can be separately dressed. Since all of the cutting teeth are presented in an identical manner to the grinding wheel and since the grinding wheel is not changed during the entire operation a uniform dressing of all the cutting teeth is assured. Moreover, since the follower pins 126 are precisely uniformly distributed around the gear 88, exact uniform spacing of the tooth faces around the circumference of workpiece 176 is obtained.

After the radial tooth faces of the reamer 176 have been dressed, relief clearance can be ground on the lands of the teeth by setting up the machine as illustrated in Figs. 1–7. Fig. 9 shows the reamer 176 in operative association with grinding wheel 28 for grinding relief clearance. When grinding a workpiece having eight cutting teeth it is desirable to use a cam in which the inclined face 134 is relatively short or restricted, as shown in Fig. 11, in order to assure adequate reciprocatory travel of the spindle 54. In general, the length of the inclined cam surface 134 should be approximately equal to the distance between adjacent cam follower pins 126, although this precise relationship is not essential and need not be maintained at all times.

In operation, all eight follower pins 126 are used so that the spindle 54 and workpiece 176 are reciprocated or oscillated eight times for each revolution thereof. It will be readily apparent that relief clearance will be ground on one of the cutting teeth for each reciprocation of the work and that all of the teeth will be acted on progressively as the work rotates. Thus, by continuously reciprocating the work in this manner and simultaneously traversing it in front of the grinding wheel 28, relief clearance will be ground along the entire length of the reamer body. During the traverse stroke, cam 144 operates in the manner hereinabove described to rotatably adjust workpiece 176 so as to compensate for the lead of the reamer teeth.

Figures 13, 14, 15:
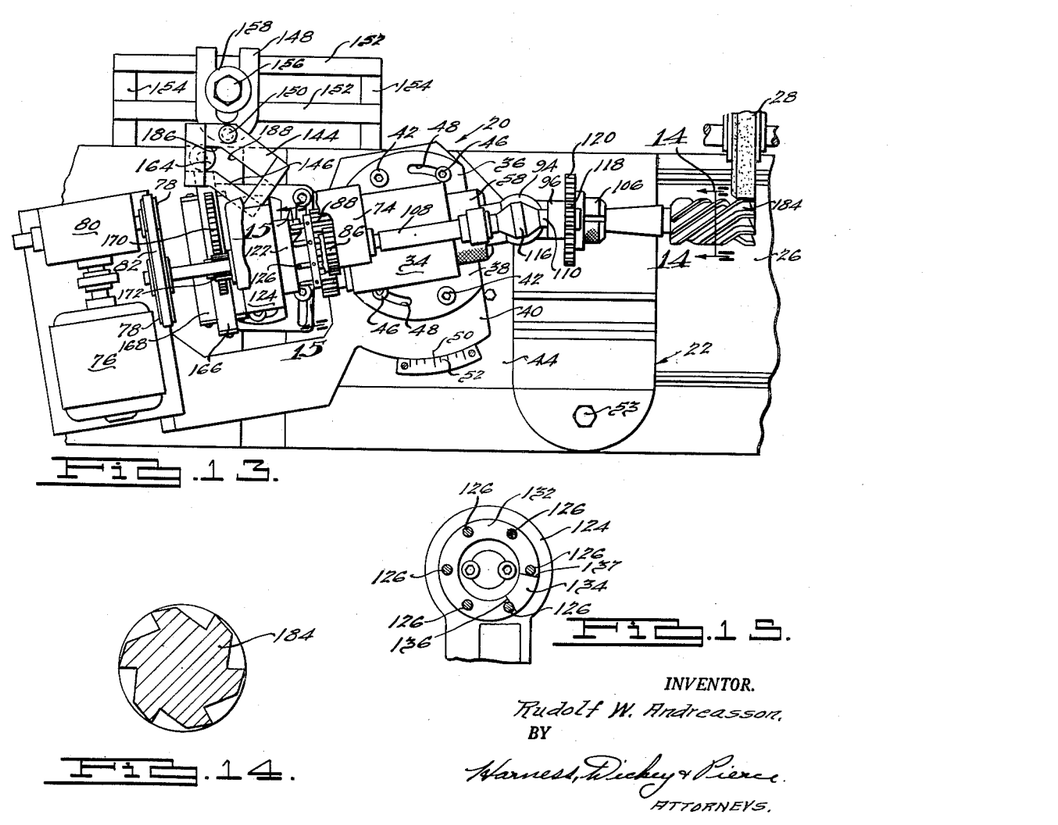
Fig. 13 is a fragmentary, top plan view showing the machine adapted for grinding peripheral relief on the cutting teeth of a special end mill cutter.
Fig. 14 is a vertical, transverse sectional view taken on the line 14—14 of Fig. 13.
Fig. 15 is a fragmentary, vertical, transverse sectional view taken in the line 15—15 of Fig. 13.

In Figs. 13–15 I have shown the machine set up to grind a special end mill cutter 184 wherein the cutting teeth have a left-hand lead and wherein the terminal portions of the teeth are parallel with the axis of the cutter. End mill cutters of the type here shown are conventional and the particular thread formation here shown is employed particularly in cases where the lead is relatively fast. If the ends of the teeth are not formed in the manner hereinabove described, the relatively large helix angle brings the teeth out to a relatively sharp point at the end of the cutter, and the teeth tend to dig into the work. Also, the relatively sharp ends of the teeth are weak and readily chip or break. In any event, it is conventional practice to form cutters of this type with axial terminal portions and the peculiar shape of the teeth creates a problem for automatic grinding. The machine embodying the present invention can be readily adapted for grinding relief clearance on tools or workpieces of this type.

The end mill cutter 184 here shown has six cutting teeth. Consequently, an annular series of six cam follower pins 126 is provided in the gear 88, and the workpiece 184 is adjusted angularly in the collet chuck 106 as described so that it is in proper operative association with the grinding wheel 28 when the pins traverse cam 122. In the present set up, the cam 144 is provided with a uniquely shaped cam track 146. Specifically, the first portion 186 of cam track 146, i. e., the portion in which the cam follower 164 is disposed at the beginning of the traverse stroke, is arranged parallel with the direction of traverse, and the latter portion 188 of the cam track is inclined angularly forwardly and inwardly with respect to the direction of traverse. The two portions of cam track 146 are so arranged and correlated that the cam follower 146 travels in the portion 186 when the wheel 28 is acting on the axial terminal portions of the cutting threads and enters the inclined portion 188 as the grinding wheel engages the helical portions of the teeth. By positioning the inclined portion 188 of cam track 146 so that it extends angularly inwardly, it will automatically rotatably adjust the cam 122 to compensate for a left-hand lead. Manifestly, the cam 146 and cam follower 164 operate automatically through the medium of rack 170 and pinion 172 to adjust the cam 122 angularly as a function of the traverse movement and in accordance with the particular lead of the cutting teeth being acted upon by grinding wheel 28.

Figures 16, 17, 18:
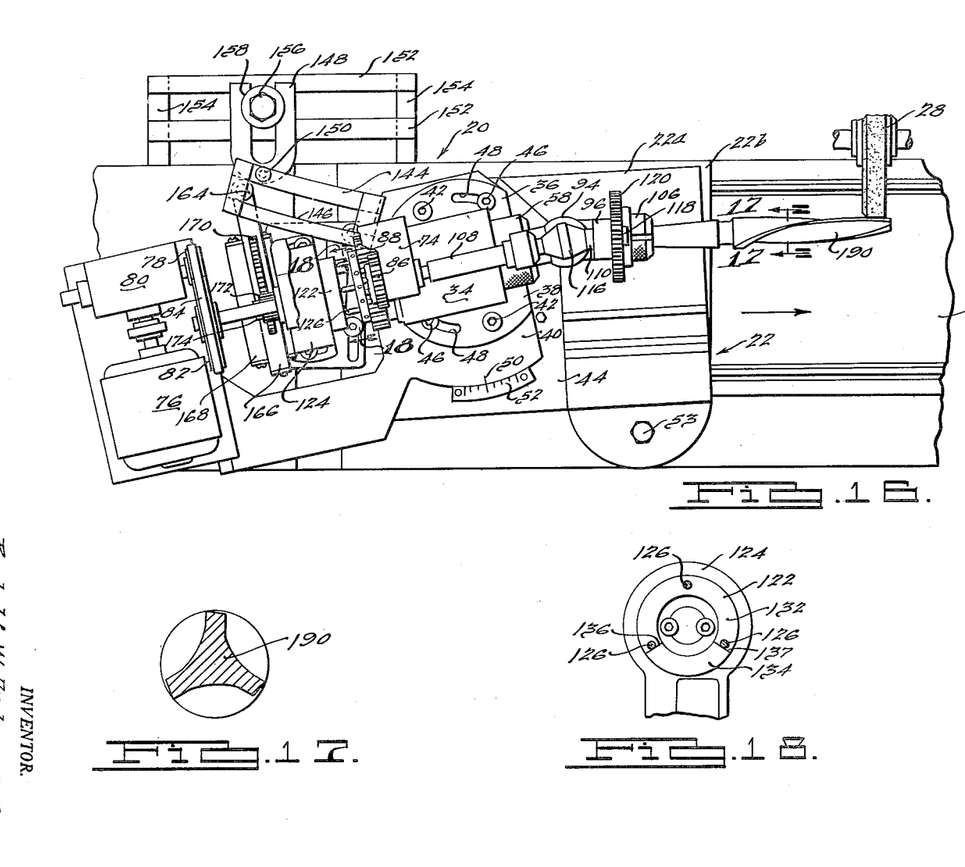
Fig. 16 is a top plan view showing the machine adapted for grinding peripheral relief on the cutting teeth of a tapered reamer.
Fig. 17 is a vertical, transverse sectional view taken on the line 17—17 of Fig. 16.
Fig. 18 is a fragmentary, vertical, transverse sectional view taken on the line 18—18 if Fig. 16.

Attention is now directed to Figs. 16–18, wherein I have shown the machine set up for grinding relief clearance on a conventional three-fluted, longitudinally tapered reamer 190 provided with helical cutting teeth having the left-hand lead. In this setup, three cam follower pins 126 are carried in equispaced relation by gear 88 and the cam 144 is positioned so that the cam track 146 extends angularly forwardly and inwardly to compensate for the left-hand lead of the cutter teeth. In grinders of the universal type, the top table section 22a is angularly adjustable about the pivot 53 and in the present setup section 22a is adjusted angularly to compensate for the taper angle of the work 190, as best shown in Fig. 16. In other words the table section 22a is adjusted so that the peripheral inner edge of the work 190 is parallel to the direction of travel of the table 22 on base 26. The machine functions in the manner hereinabove described to grind relief clearance on the cutting teeth of the reamer 190 and also to compensate for the lead of the teeth.

In the case of a tapered tool of the type here shown, the helix angle of the cutter teeth varies progressively along the length of the tool body even though the lead remains constant. Under these circumstances, the cam 122 must be rotatably adjusted during traverse to compensate for the lead of the teeth and it also is necessary to adjust the rate of angular adjustment of the cam progressively during the traverse stroke to compensate for changes in the helix angle. Manifestly, the rate of change in angular adjustment of cam 122 varies, depending upon the taper angle of the work. In most instances, the taper angles are relatively slight and the change in the rate of adjustment of the cam 122 therefore is correspondingly slight. However, variation in the rate of angular adjustment of the cam 122 will be necessary in every instance where the work is tapered longitudinally in order to maintain a precise, uniform, spatial relation between the cutting edges of the teeth and the grinding wheel at all times during the traverse stroke. According to the present invention this change in the rate of angular adjustment of cam 122 can be accomplished easily and expeditiously by making cam track 146 slightly curved or arched for its entire length, as shown in the drawing. Actually, the amount of arc is very slight and the arc is shown somewhat exaggerated in the drawings in order to illustrate the principle of operation.

It may thus be seen that I have achieved the objects of my invention. I have increased the versatility of the machine disclosed in my prior application so that it can be used to grind relief clearance on helical cutting teeth and so that it can be readily adapted for grinding workpieces having a wide variety of teeth shapes. Further, the instant machine can be used to grind simultaneously both the O. D. and relief clearance on a workpiece whereby to reduce the number of separate operations to be performed on the work and to substantially mitigate production costs.

Having thus described the invention, I claim:

1. In a grinding machine, a reciprocable support means; a rotatable and reciprocable spindle carried by said support means; means for rotatably driving said spindle; a rotatably adjustable cam on said support means at one end and spaced from said spindle; resilient means urging said spindle axially in the direction of said cam; cam follower means carried by the mentioned end of the spindle disposed to travel along said cam during rotation of the spindle; and means rendered operative by reciprocation of said support means for rotatably adjusting said cam.

2. In a grinding machine, a slidable table; a rotatable and reciprocable spindle supported by and movable with said table; means for rotatably driving said spindle; means including a rotatably adjustable cam for reciprocably actuating said spindle independently of the movement of said table; and means rendered operative by actuation of said table for rotatably adjusting said cam at a predetermined rate correlated with the rate of travel of said table.

3. In a grinding machine, means for supporting and rotating a workpiece in grinding position with respect to a grinding wheel; means for traversing the work in front of said grinding wheel; means including a rotatably adjustable cam for oscillating said workpiece in synchronism with rotation thereof and independently of said traversing movement; and means operative in response to said traverse movement for rotatably adjusting said cam at a predetermined rate correlated with said traverse movement.

4. In a grinding machine, means for supporting and rotating a workpiece in grinding position with respect to a grinding wheel; means for traversing the work in front of the grinding wheel; means including a rotatably adjustable cam for oscillating said workpiece relative to the grinding wheel in synchronism with rotation thereof and independently of said traversing movement; and means including a second cam means for rotatably adjusting said first-mentioned cam at a predetermined rate according to said traversing movement.

5. In a grinding machine, means for supporting and rotating a workpiece in grinding position with respect to a grinding wheel; means for traversing the work in front of the grinding wheel; means including a rotatably adjustable cam for oscillating said workpiece to and from the grinding surface of the wheel in synchronism with rotation thereof and independently of said traversing movement; and means rendered operative by traverse movement of said workpiece to rotatably adjust said cam, said adjusting means including a stationary cam and a cam follower engageable with said stationary cam and movable with said workpiece during traverse movement thereof.

6. In a grinding machine, means for supporting and rotating a tool having helical cutting teeth in grinding position with respect to a grinding wheel; means for traversing the tool in front of the grinding wheel; means including a rotatably adjustable cam for oscillating the tool relative to the grinding wheel in synchronism with tool rotation for relief grinding; and means rendered operative by said traversing movement for rotatably adjusting said cam according to the lead of the cutting teeth so that the relieved surfaces are maintained constantly uniform with respect to the cutting edges of said teeth.

7. In a grinding machine, means for supporting and rotating a tool having helical cutting teeth in grinding position with respect to a grinding wheel; means for traversing the work in front of the grinding wheel; means for oscillating the tool relative to the grinding wheel in synchronism with tool rotation for relief grinding, said means including a rotatably adjustable cam provided with an annular cam face having an inclined portion which effects oscillation and also correlates oscillation with rotary movement of the tool; and means for rotatably adjusting said cam in accordance with the lead of said cutting teeth.

8. In a grinding machine, means for supporting and rotating a tool having helical cutting teeth in grinding position with respect to a grinding wheel; means for traversing the tool in front of the grinding wheel; means including a rotatably adjustable cam for oscillating the tool to and from the grinding surface of the wheel in synchronism with tool rotation for relief grinding; a stationary cam means having a cam track; a cam follower movable in said cam track by traverse movement of said tool; and rack-and-pinion means associated with the first cam and actuated by said cam follower to rotatably adjust said first cam in accordance with the lead of said cutting teeth as the tool makes its traverse stroke.

9. The combination as set forth in claim 8 wherein said second cam is angularly adjustable to adapt the machine for tools having cutting teeth of different leads.

10. In a grinding machine, means for supporting and rotating a workpiece in grinding position with respect to a grinding wheel; means for traversing the work in front of the grinding wheel; means including a rotatably adjustable cam for oscillating said workpiece relative to the grinding wheel in synchronism with rotation thereof and independently of said traversing movement; and means for rotatably adjusting said cam during translatory movement of the work including a cam track, a follower in said cam track movable axially with the work during traverse movement thereof, a rack connected to and movable with said follower, and a pinion mounted for mutual rotation with said cam rotatably driven by said rack.

11. In a grinding machine, means for supporting and rotating a workpiece in grinding position with respect to a grinding wheel; means for traversing the work in front of the grinding wheel; means including a rotatably adjustable cam for oscillating said workpiece relative to the grinding wheel in synchronism with rotation thereof and independently of said traverse movement; and means for rotating said cam during traverse movement of the work including a stationary cam track disposed in oblique angular relation with respect to the direction of said traverse movement, a follower mounted in said cam track and movable therein with the work during said traverse movement, whereby the follower is moved relative to the work and in a direction normal to the axis thereof by said track during said traverse movement, and rack-and-pinion means actuated by the follower to rotatably adjust said cam.

RUDOLF W. ANDREASSON.

REFERENCES CITED

The following references are of record in the file of this patent:

UNITED STATES PATENTS

| Number | Name | Date |
|---|---|---|
| 286,663 | Wheeler | Oct. 16, 1883 |
| 407,721 | Cox | July 23, 1889 |
| 1,323,452 | Cogsdill | Dec. 2, 1919 |
| 1,402,473 | Bickford | Jan. 3, 1922 |
| 1,478,433 | Harris | Dec. 25, 1923 |
| 1,806,562 | Pichler | May 19, 1931 |
| 2,325,364 | Boening | July 27, 1943 |
| 2,389,401 | Andreasson | Nov. 20, 1945 |
| 2,406,134 | Cameron | Aug. 20, 1946 |
| 2,434,753 | Andreasson | Jan. 20, 1948 |
| 2,471,539 | Parker | May 31, 1949 |
| 2,482,802 | Sanders | Sept. 27, 1949 |